(12) United States Patent
Caron Kardos et al.

(10) Patent No.: US 10,857,436 B2
(45) Date of Patent: Dec. 8, 2020

(54) 3D WEAVING MATERIAL AND METHOD OF 3D WEAVING FOR SPORTING IMPLEMENTS

(71) Applicant: BAUER Hockey Inc., Exeter, NH (US)

(72) Inventors: Jean-Frédérik Caron Kardos, Lorraine (CA); Mathieu Ducharme, Prevost (CA)

(73) Assignee: Bauer Hockey, Inc., Exeter, NH (US)

( * ) Notice: Subject to any disclaimer, the term of this patent is extended or adjusted under 35 U.S.C. 154(b) by 507 days.

(21) Appl. No.: 15/448,769

(22) Filed: Mar. 3, 2017

(65) Prior Publication Data

US 2017/0252617 A1    Sep. 7, 2017

Related U.S. Application Data

(60) Provisional application No. 62/303,756, filed on Mar. 4, 2016.

(51) Int. Cl.
*A63B 60/48* (2015.01)
*B29C 70/24* (2006.01)
(Continued)

(52) U.S. Cl.
CPC .............. *A63B 60/48* (2015.10); *A63B 59/70* (2015.10); *B29C 70/24* (2013.01); *B32B 5/024* (2013.01);
(Continued)

(58) Field of Classification Search
None
See application file for complete search history.

(56) References Cited

U.S. PATENT DOCUMENTS 3,818,951 A    6/1974  Greenwood
4,055,697 A   10/1977  Schmanski
(Continued)

FOREIGN PATENT DOCUMENTS

CN          2768849 Y    4/2006
DE     102012211570 A1   8/2013
(Continued)

OTHER PUBLICATIONS

Oct. 12, 2018—(EP) European Action—App 17714579.4—MM.
(Continued)

*Primary Examiner* — Shawn Mckinnon
(74) *Attorney, Agent, or Firm* — Banner & Witcoff, Ltd.

(57) ABSTRACT

Methods for fabricating a 3D woven material and exemplary 3D woven material for sporting implements are disclosed. The exemplary weaves can be incorporated into any sporting implements, such as, baseball bats, lacrosse sticks, hockey sticks, rackets, helmets, and other protective equipment. The example sporting implement can be constructed, partially or entirely, with a woven or braided three dimensional structure. The 3D woven material can be a multi-directional layup having tows oriented in three directions (X, Y and Z) and also at any angle created by the combination of two or three directions. A single woven preform can be formed that can have a near net shape of the formed product, with the fibers oriented in a way that will be optimal for the particular application.

5 Claims, 7 Drawing Sheets

(51) Int. Cl.
*B32B 5/02* (2006.01)
*A63B 59/70* (2015.01)
*D03D 25/00* (2006.01)
*B32B 5/08* (2006.01)
*B32B 5/06* (2006.01)
*B32B 5/26* (2006.01)
*B32B 5/24* (2006.01)
*B32B 5/12* (2006.01)
*B32B 5/18* (2006.01)
*A63B 59/00* (2015.01)
*A63B 102/18* (2015.01)
*A63B 102/14* (2015.01)
*A63B 102/24* (2015.01)
*B29K 307/04* (2006.01)
*B29L 31/52* (2006.01)

(52) U.S. Cl.
CPC ............ *B32B 5/06* (2013.01); *B32B 5/08* (2013.01); *B32B 5/12* (2013.01); *B32B 5/18* (2013.01); *B32B 5/245* (2013.01); *B32B 5/26* (2013.01); *D03D 25/005* (2013.01); *A63B 59/00* (2013.01); *A63B 2102/14* (2015.10); *A63B 2102/18* (2015.10); *A63B 2102/24* (2015.10); *A63B 2209/023* (2013.01); *B29K 2307/04* (2013.01); *B29L 2031/52* (2013.01); *B32B 2250/02* (2013.01); *B32B 2260/023* (2013.01); *B32B 2260/046* (2013.01); *B32B 2262/0253* (2013.01); *B32B 2262/0269* (2013.01); *B32B 2262/10* (2013.01); *B32B 2262/101* (2013.01); *B32B 2262/106* (2013.01); *B32B 2307/50* (2013.01); *B32B 2307/546* (2013.01); *B32B 2307/558* (2013.01); *B32B 2437/04* (2013.01); *B32B 2571/00* (2013.01); *D10B 2507/00* (2013.01)

(56) References Cited

U.S. PATENT DOCUMENTS

| | | | |
|---|---|---|---|
| 4,119,748 A | 10/1978 | Verbauwhede et al. | |
| 4,725,485 A | 2/1988 | Hirokawa | |
| 4,868,038 A | 9/1989 | McCullough, Jr. et al. | |
| 5,137,058 A | 8/1992 | Anahara et al. | |
| 5,173,358 A | 12/1992 | Anahara et al. | |
| 5,236,020 A | 8/1993 | Sakatani et al. | |
| 5,407,195 A | 4/1995 | Tiitola et al. | |
| 5,413,837 A | 5/1995 | Rock et al. | |
| 5,540,877 A | 7/1996 | Repetto et al. | |
| 5,653,646 A | 8/1997 | Negishi et al. | |
| 6,129,122 A | 10/2000 | Bilisik | |
| 6,184,161 B1 | 2/2001 | Verpoest | |
| 6,270,426 B1 | 8/2001 | Matsumoto | |
| 6,315,007 B1 | 11/2001 | Mohamed et al. | |
| 6,723,012 B1 | 4/2004 | Sutherland | |
| 6,748,601 B2 | 6/2004 | LaShoto et al. | |
| 7,138,345 B2 | 11/2006 | Wadahara et al. | |
| 7,232,388 B2 | 6/2007 | Sutherland et al. | |
| 7,611,997 B2 | 11/2009 | Wigent, III | |
| 7,628,710 B2 | 12/2009 | Kumamoto | |
| 7,888,274 B2 | 2/2011 | Tsuji et al. | |
| 7,943,535 B2 | 5/2011 | Goering et al. | |
| 8,114,792 B2 | 2/2012 | Kuang et al. | |
| 8,312,827 B1 | 11/2012 | Free | |
| 8,677,599 B2 | 3/2014 | Gans | |
| 9,005,755 B2 | 4/2015 | Ledford et al. | |
| 2002/0082112 A1 | 6/2002 | Unosawa et al. | |
| 2006/0060257 A1 | 3/2006 | Iwashita | |
| 2008/0193709 A1 | 8/2008 | Han | |
| 2008/0261014 A1* | 10/2008 | McGuire | B29C 37/0025 428/297.1 |
| 2008/0277047 A1 | 11/2008 | Kubota et al. | |
| 2008/0287228 A1 | 11/2008 | Giannetti | |
| 2010/0323574 A1 | 12/2010 | Dunleavy | |
| 2011/0182743 A1 | 7/2011 | Naik | |
| 2011/0277869 A1 | 11/2011 | Coupe et al. | |
| 2013/0065714 A1 | 3/2013 | Avnery et al. | |
| 2013/0143689 A1 | 6/2013 | Nakajima | |
| 2013/0225022 A1 | 8/2013 | Tam et al. | |
| 2013/0309490 A1 | 11/2013 | Seike et al. | |
| 2014/0283671 A1 | 9/2014 | Head et al. | |
| 2014/0322504 A1 | 10/2014 | Narimatsu et al. | |
| 2014/0342630 A1 | 11/2014 | Amtmann et al. | |
| 2014/0360618 A1 | 12/2014 | Shan et al. | |
| 2015/0111457 A1 | 4/2015 | Khokar | |

FOREIGN PATENT DOCUMENTS

| | | |
|---|---|---|
| EP | 0341575 A2 | 11/1989 |
| EP | 0687315 A1 | 12/1995 |
| GB | 2496583 A | 5/2013 |
| JP | H02 305580 A | 12/1990 |
| JP | H09157993 A | 6/1997 |
| JP | 2008307692 A | 12/2008 |
| WO | 9501820 A1 | 1/1995 |
| WO | 0138622 A1 | 5/2001 |
| WO | 2010115538 A1 | 10/2010 |

OTHER PUBLICATIONS

Aug. 11, 2017—(PCT) International Search Report and Written Opinion—App PCT/US2017/020630.

Kadir Bilisik—"Multaxis three-dimensional weaving for composites: A review", Textile Research Journal, vol. 82, No. 7 May 1, 2012, pp. 725-743.

\* cited by examiner

3D WEAVING MATERIAL AND METHOD OF 3D WEAVING FOR SPORTING IMPLEMENTS

CROSS REFERENCE TO RELATED APPLICATIONS

This application claims the benefit of U.S. Provisional Application No. 62/303,756, filed Mar. 4, 2016, which is incorporated herein by reference in its entirety.

FIELD

This disclosure relates generally to carbon fiber weaving materials and methods. More particularly, aspects of this disclosure relate to 3D weaving materials in sporting implements.

BACKGROUND

Sporting implements have transitioned from metal structures to glass or carbon fiber reinforced composite structures. Composite structures can be formed by stacking layers of different orientations or materials to achieve a desired thickness and then forming them into the requisite shape. With this design, the resulting part may lack strength or stiffness in the perpendicular direction or the z-direction in certain instances. Additionally, the formed parts can delaminate easily since they are only connected through a matrix in some instances. The inter-laminar weakness can, in certain instances, play a major role in the failure of the formed structures in select adaptations.

SUMMARY

The following presents a general summary of aspects of the invention in order to provide a basic understanding of the invention and various features of it. This summary is not intended to limit the scope of the invention in any way, but it simply provides a general overview and context for the more detailed description that follows.

In one aspect of the disclosure, a sporting implement can have an increased resistance to delamination. The sporting implement can be formed of a weave or braid constructed in three dimensions, which can have varying geometry in either the shape or in the fiber orientation of the weave.

Other objects and features of the disclosure will become apparent by reference to the following description and drawings.

BRIEF DESCRIPTION OF THE DRAWINGS

A more complete understanding of the present disclosure and certain advantages thereof may be acquired by referring to the following detailed description in consideration with the accompanying drawings, in which.

The reader is advised that the attached drawings are not necessarily drawn to scale.

DETAILED DESCRIPTION

In the following description of various example structures in accordance with the disclosure, reference is made to the accompanying drawings, which form a part hereof, and in which are shown by way of illustration of various structures in accordance with the disclosure. Additionally, it is to be understood that other specific arrangements of parts and structures may be utilized, and structural and functional modifications may be made without departing from the scope of the present disclosure. Also, while the terms "top" and "bottom" and the like may be used in this specification to describe various example features and elements of the disclosure, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of this disclosure.

In general, as discussed herein, aspects of this disclosure relate to methods for fabricating a 3D woven material and an exemplary 3D woven material for sporting implements. The exemplary weaves can be incorporated into any sporting implements, such as, baseball bats, lacrosse sticks, hockey sticks, rackets, helmets, and other protective equipment.

An example sporting implement can be constructed, partially or entirely, with a woven or braided three dimensional structure. The weave can be formed by a series of tows. A tow may include a collection or grouping of materials that extend together in a single direction and may include one or multiple fibers. Suitable fibers can include carbon, aramids, glass, basalt, or polypropylene. In certain examples, the tows can be formed of monofilaments, multiple filaments or combinations thereof, and the tows can have a variety of different cross sectional shapes, such as circular, ellipsoidal, triangular, or flat shaped in the form of tapes.

The 3D woven material can be a multi-directional layup having fibers oriented in three directions, warp (X), weft (Y) and the Z directions, and also at any angle created by a combination of two or three directions. In one example, a single woven preform can be formed that will have a near net shape of the formed product, with the fibers oriented in a way that will be optimal for the particular application. The structure can also be made to have minimal crimps in the warp direction (the longitudinal direction of the sporting implement) in desired areas by having fewer fibers in the Z directions, while having a high degree of fibers interlacing in different areas prone to delamination to provide strength to the sporting implement.

In one particular example, multiple fibers, such as a carbon, aramid, glass, or polypropylene fiber, can be grouped together and spread substantially flat to form thin elongated groups of fibers or fiber tapes. However, it is also contemplated that other numbers of fibers can be used to form the tapes depending on the desired strength and coverage of the fiber tapes. The tapes can be weaved in a three dimensional arrangement to form a woven material. The woven material can then be formed into the desired shape of the formed part or the sporting implement. Some types of fabrics, such as multilayer or angle interlock, could be fabricated with conventional weaving equipment for example, a shuttle loom. However, more complex woven structures, such as orthogonal or angled multilayer may necessitate machinery designed specifically for 3D structure such as a Jacquard type of weaving machine. The weave may be made using a pre-impregnated braid. Alternatively, the tapes can be formed dry and then during the molding process can be injected with resin. This process may be referred to as resin-transfer molding or infusion.

Figure 1:
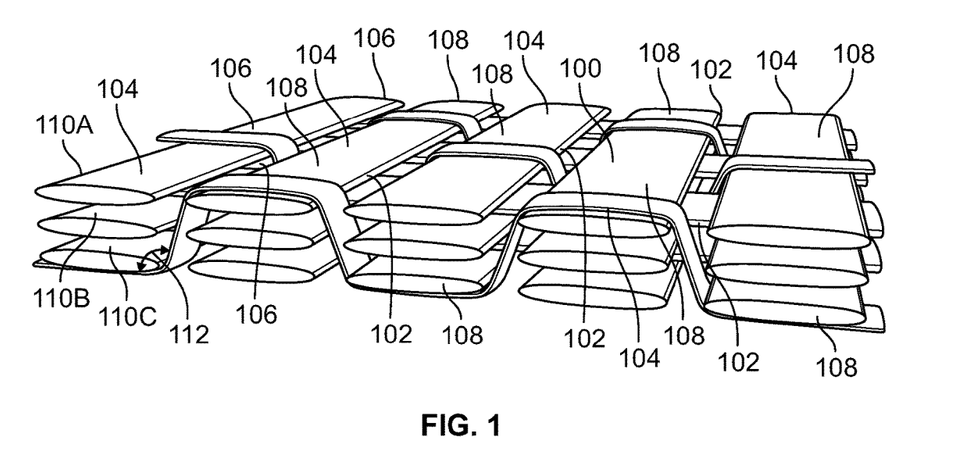
FIG. 1 illustrates an exemplary weaving pattern.

FIG. 1 shows an example weaving pattern of tows or tapes for forming a woven fabric 100. In this example, a plurality of first tapes 102, a plurality of second tapes 104, and a plurality of third tapes 106 can extend in each of the X, Y, and Z directions to form the woven fabric 100. In this example, the plurality of first tapes 102 can extend generally in the X direction, which can also be referred to as the warp direction. The plurality of second tapes 104 can extend generally in the Y direction, which can also be referred to as the weft direction. As is shown in FIG. 1, the plurality of first tapes 102 can extend generally orthogonal to the plurality of second tapes 104 to form rows or layers 110A, 110B, and 110C, and each row 110A, 110B, and 110C of the plurality of first tapes 102 or the plurality of second tapes 104 can form a single layer. It is also contemplated that the plurality of first tapes 102 and the plurality of second tapes 104 could be formed at other non-orthogonal angles or offset relative to one another. In the example shown in FIG. 1, three layers 110A, 110B, and 110C are shown. However, any number of layers can be included depending on the desired strength of the material.

The plurality of third tapes 106 can extend both in the Z direction and in the X direction. Portions of the third tapes 106 can also extend in the X direction parallel to the plurality of first tapes 102 adjacent to spacing formed between the plurality of first tapes 102. The portions of the third tapes 106 that extend in the X direction also form loops or crimps 108 around the plurality of the second tapes 104 on the top layer 110A and around the plurality of second tapes 104 on the bottom layer 110C. The third tapes 106, specifically the loops 108, help to maintain the layers formed by the plurality of first tapes 102 and the plurality of second tapes 104 together in the formed 3D weave. This helps to maintain the 3D woven material together during the formation of the part and also helps to increase resistance to crack propagation between layers or rows during operation or use of the formed part.

In this example, the plurality of third tapes 106 can extend in the X direction every three layers or rows 110A, 110B, 110C of the plurality of first tapes 102 and the plurality of second tapes 104. Also, as shown in this example, the plurality of third tapes 106 can extend at an angle 112 with respect to planes defined by each of the layers formed by the plurality of first tapes 102 and the plurality of second tapes 104. In this example, the angle 112 can be formed greater than 90°. For example, the angle can be formed in a range of 90° to 180° and, in one specific example, can be formed at 135°. In certain examples, the plurality of third tapes 106 can skip passing around a layer, and the angle 112 can be 180°. Other angles, including angles less than 90°, are contemplated depending on the desired strength and rigidity of the material.

Figure 2:
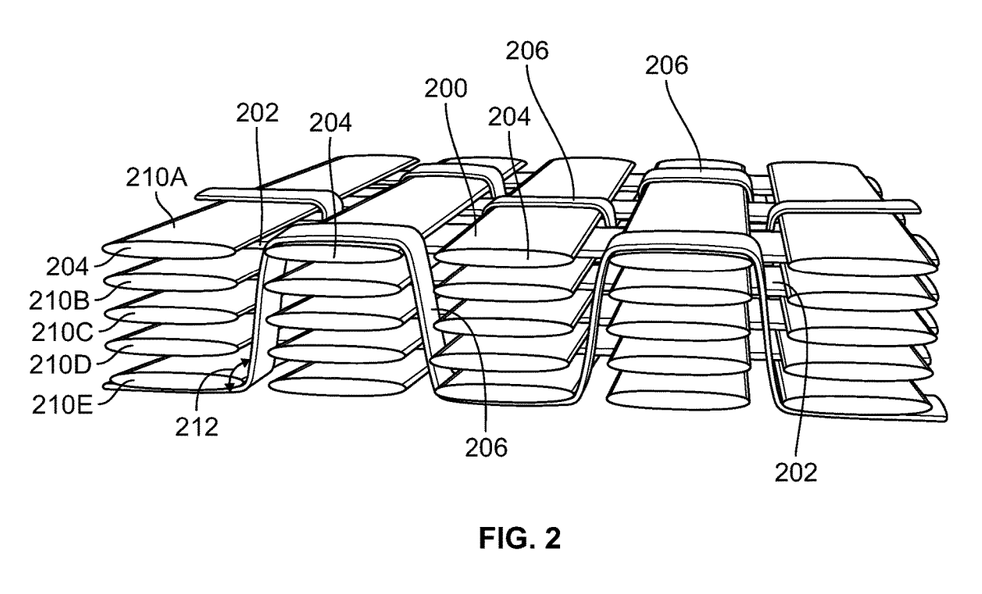
FIG. 2 illustrates a variation of the weaving pattern in FIG. 1.

FIG. 2 shows a variation of the weaving pattern of FIG. 1 for forming a woven fabric 200. This example is similar to the example discussed above in relation to FIG. 1, where similar reference numbers represent similar tows or tapes. However, in this example, the plurality of third tapes 206 can extend in the X direction every fifth layer of layers 210A, 210B, 210C, 210D, and 210E of the plurality of first tapes 202 and the plurality of second tapes 204. Additionally, the angle 212 formed between the plurality of third tapes and the layers 210A, 210B, 210C, 210D, and 210E of the plurality of first tapes 202 and the plurality of second tapes 204 can be a smaller angle than that of the weaving pattern disclosed in relation to FIG. 1. This example also provides a thicker structure resulting in a stronger yet heavier structure for higher impacts. Additional layers can also be provided, for example, 3-12 layers may be provided, with the angle 212 ranging from 0° to 180°. Other numbers of layers are also contemplated.

Although in the examples shown in relation to FIGS. 1 and 2, the layers formed by the plurality of first tapes and the plurality of second tapes are formed parallel or at 90° in relation to each other, the layers can be oriented at different angles or can be formed non-parallel with an offset in relation to the longitudinal direction to provide more rigid or more flexible structures. For example, the layers can be oriented at a range of 5° to 90°, and in certain examples can be oriented at 5° to 75° and specifically at ±30°, ±45° or 90° in relation to the longitudinal direction of the sporting implement. Similar to the examples discussed above in relation to FIGS. 1 and 2, the layers can then be linked by tapes extending in the Z direction and weaved in a perpendicular or substantially perpendicular direction or other angles as discussed above in relation to the plane created by the layers in the case of orthogonal weaving.

Figure 3A:
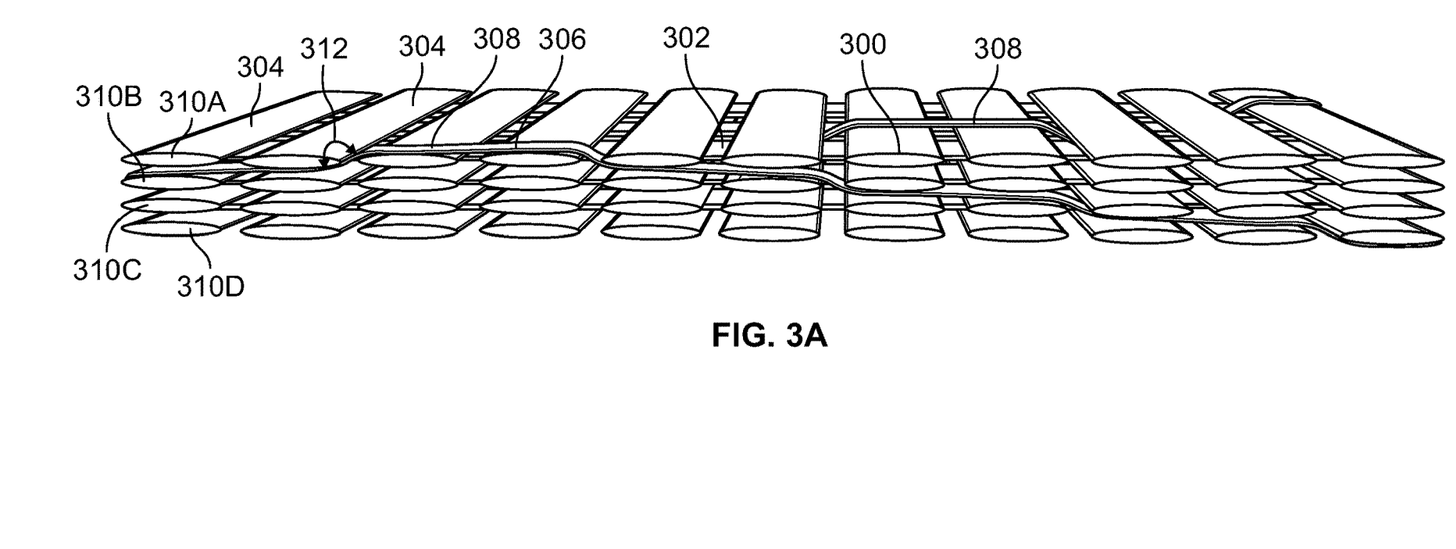
FIG. 3A illustrates a perspective view of another exemplary weaving pattern.
Figure 3B:
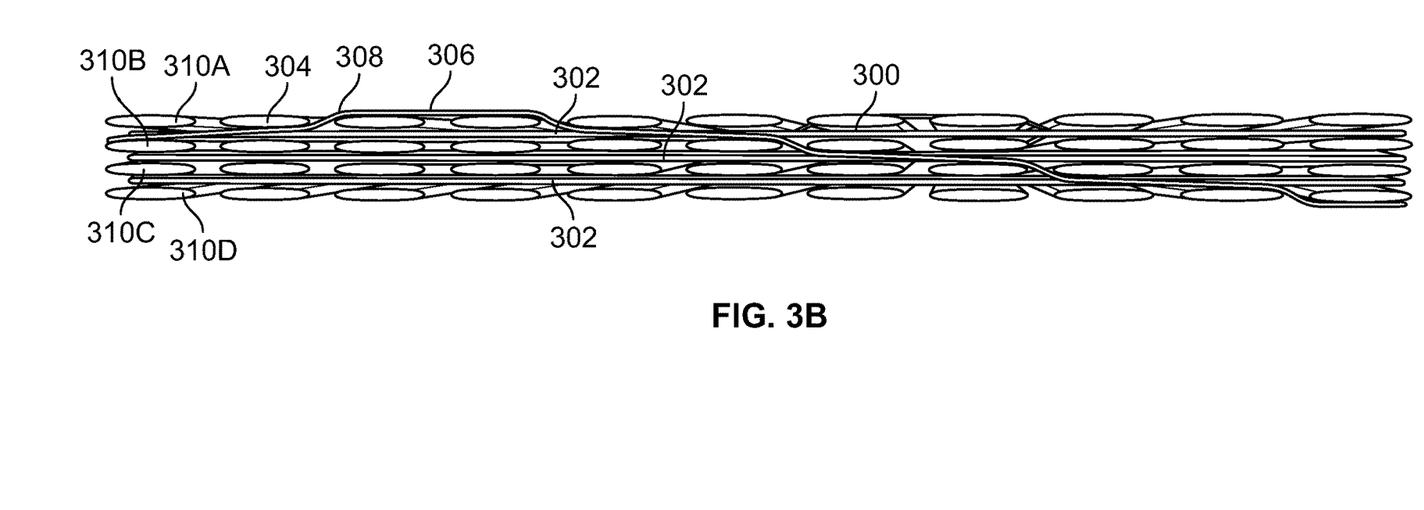
FIG. 3B illustrates a cross-sectional view of the exemplary weaving pattern of FIG. 3A.

FIGS. 3A and 3B show an alternative weaving pattern for forming a woven fabric 300. This example is similar to the example discussed above in relation to FIG. 1, where similar reference numbers represent similar tows or tapes. However, in this example, the plurality of third tapes 306 can extend in the X direction every layer of layers 310A, 310B, 310C, and 310D of the plurality of first tapes 302 and the plurality of second tapes 304 across selected pairs of the second tapes 304. Specifically, the plurality of third tapes 306 form loops or crimps 308, which wrap pairs of second tapes 304. Additionally, the angle 312 formed between the plurality of third tapes and the layers 310A, 310B, 310C, and 310D, of the plurality of first tapes 302 and the plurality of second tapes 304 can be a larger angle than that of the weaving pattern disclosed in relation to FIG. 1. In this example, in wrapping pairs of the second tapes 304, the plurality of third tapes can form a fewer amount of crimps or hoops 308 around the plurality of second tapes 304. The fewer number of crimps results in a stiffer formed structure.

Figure 4:
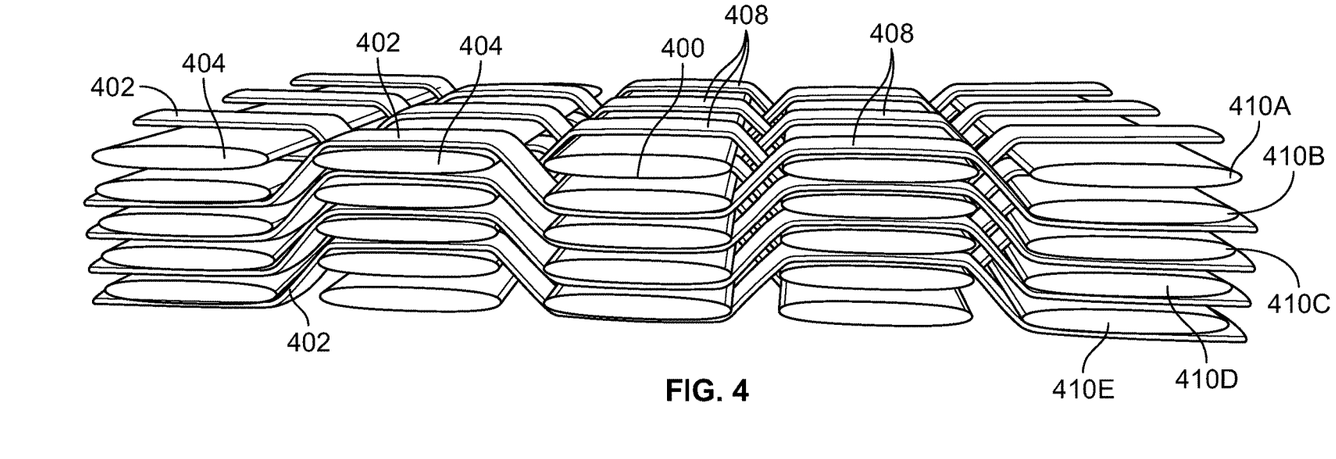
FIG. 4 illustrates a perspective view of another exemplary weaving pattern.

FIG. 4 shows another alternative weaving pattern for forming a woven fabric 400. This example is similar to the example discussed above in relation to FIG. 1 above, where similar reference numbers represent similar tows or tapes. However in this example, the warps 402 can extend both in the X direction and the Z direction thus eliminating the need altogether for the third plurality of tapes. Additionally, each warp 402 can extend orthogonally to its adjacent warp between the wefts 404. Other angles are also contemplated depending on the thickness of the wefts. Each weft 404 can include multiple crimps or hoops 408 formed by the warps 402. Moreover, the warps 402 can form an alternating sinusoidal-like pattern between adjacent layers the wefts 404.

Figure 5:
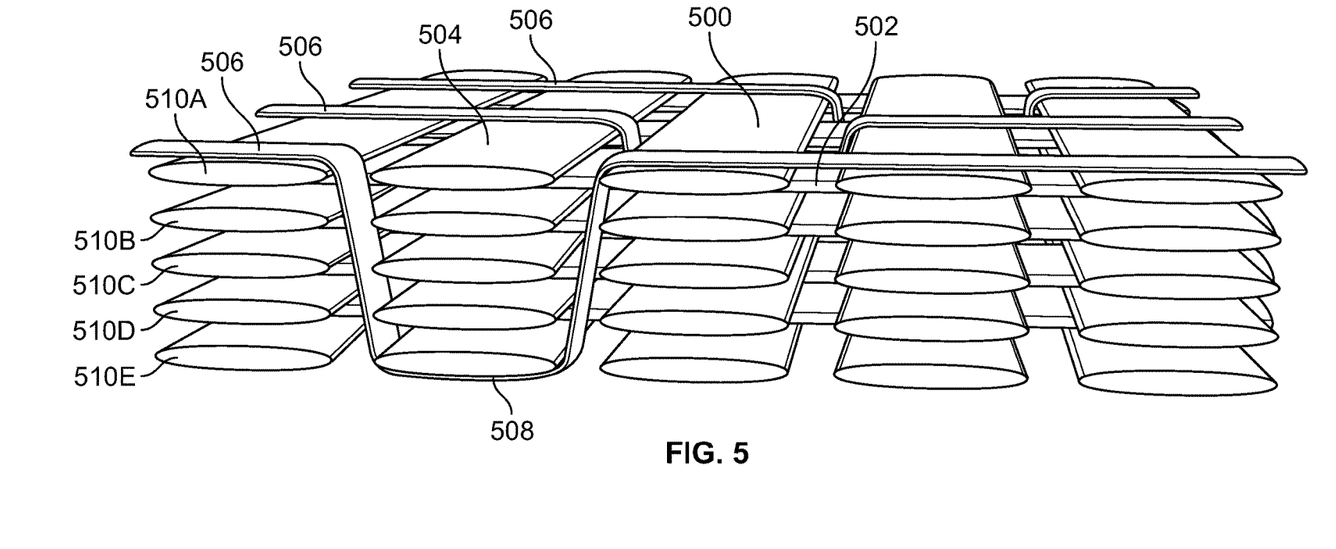
FIG. 5 illustrates a perspective view of another exemplary weaving pattern.

FIG. 5 shows another alternative weaving pattern for forming a woven fabric 500. This example is similar to the example discussed above in relation to FIG. 1, where similar reference numbers represent similar tows or tapes. In this example, the plurality of first tapes 502 and the plurality of second tapes 504 can be formed orthogonal to each other. However, in this example, fewer crimps or loops 508 can be formed by the plurality of third tapes 506. In this example, the crimps or loops 508 can be formed over each column of second tapes 504 alternatingly each row of layers 510A, 510B, 510C, and 510D in the X direction. In one example, the woven fabric could be used in an area where additionally rigidity is desired or in an area that may be subjected to fewer impacts.

Figure 6A:
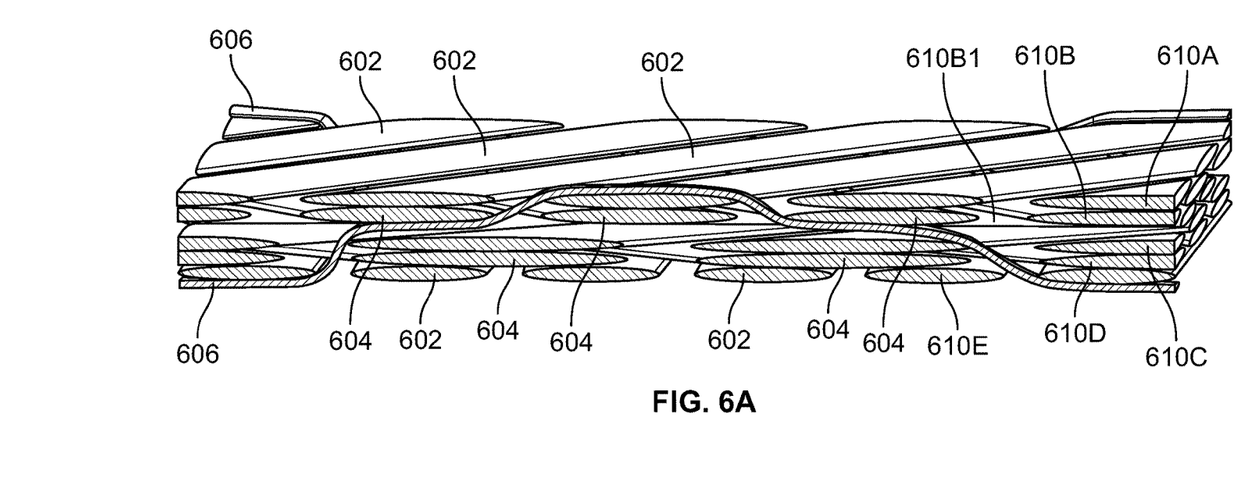
FIG. 6A illustrates a perspective view of another exemplary weaving pattern.
Figure 6B:
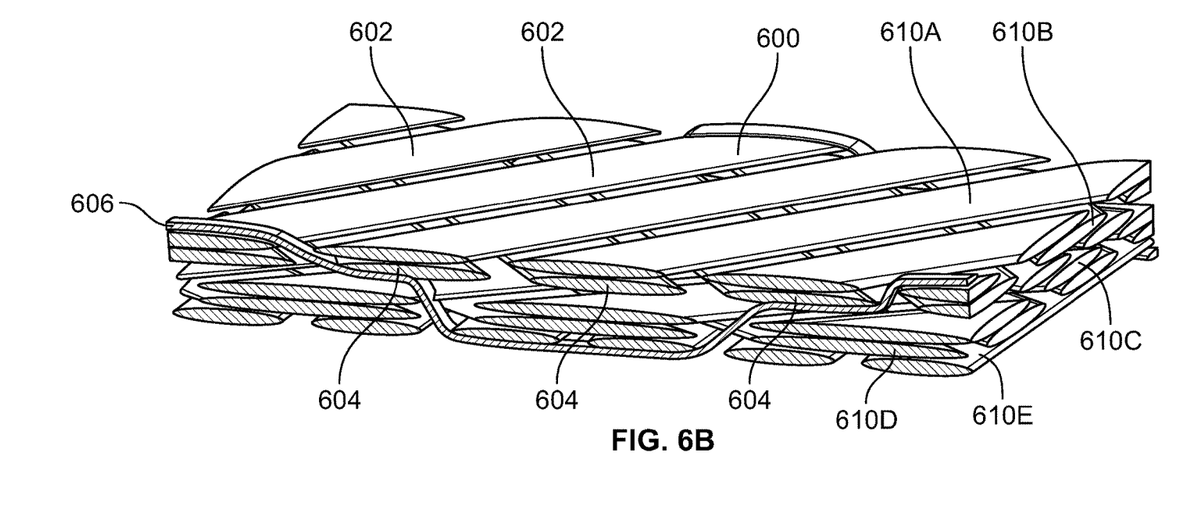
FIG. 6B illustrates another perspective view of the exemplary weaving pattern of FIG. 6A.
Figure 6C:
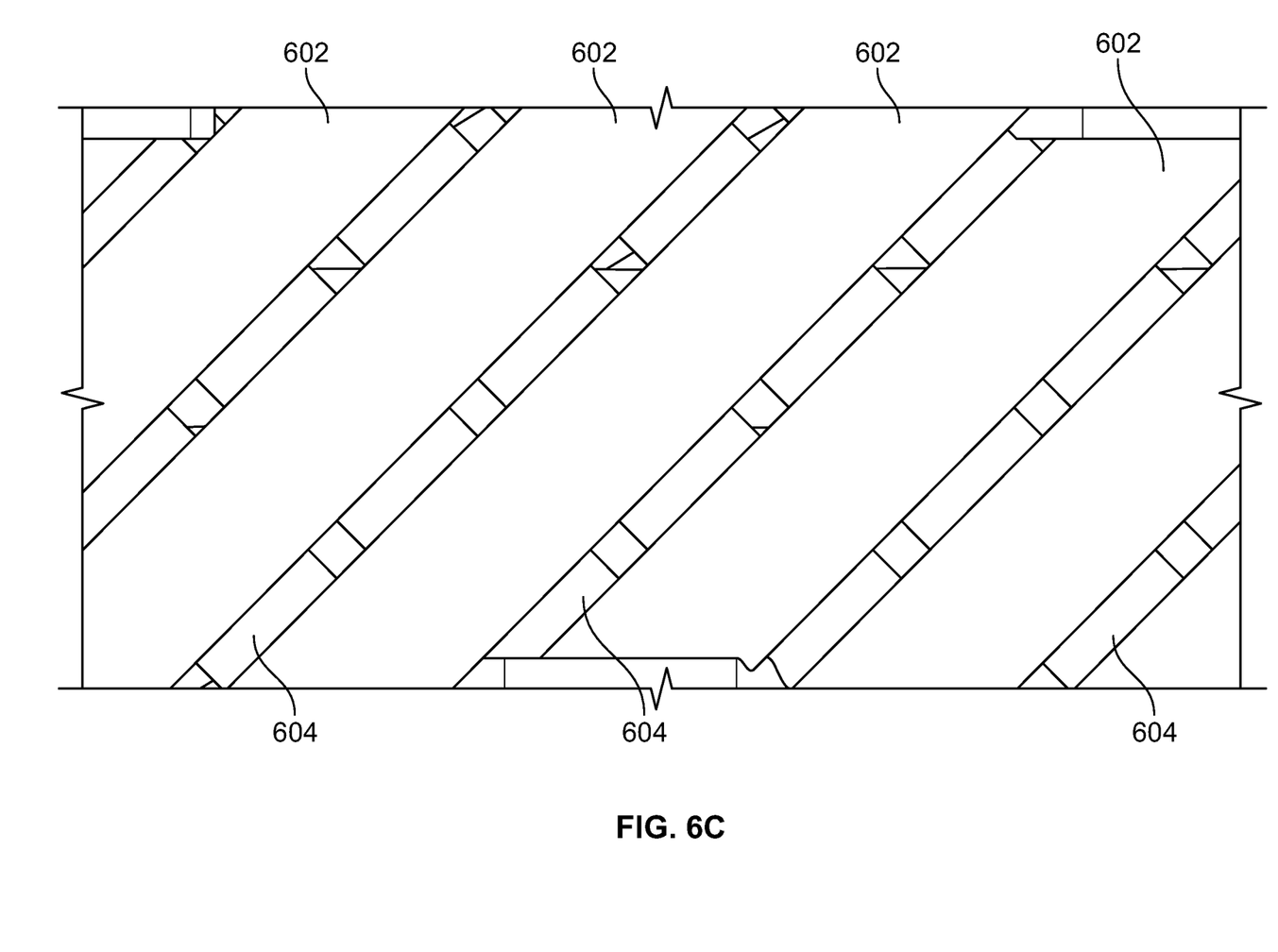
FIG. 6C illustrates a top view of the exemplary weaving pattern of FIG. 6A.

FIGS. 6A-6C show another alternative weaving pattern for forming a woven fabric 600. This example is similar to the example discussed above in relation to FIG. 1, where similar reference numbers represent similar tows or tapes. However, in this example, the plurality of first tapes 602 and the plurality of second tapes 604 can be weaved at ±45° angles relative to the X and Y axes and may also be weaved orthogonal to each other. Additionally, the plurality of first tapes 602 can form separate layers, e.g., 610A and 610C, and the plurality of second tapes 604 can from separate layers 610B and 610D. In addition, the plurality of first tapes 602 can change orientation every row or every few rows. In this example, row 610A can be at +45, 610B can be at −45°, row 610C can be at +30°, row 610D can be at −30°, and row 610E can be at 90° relative to the X axis. Also, another row 610B1 can be positioned between row 610B and row 610C and can be oriented at 0°.

For example, as shown in FIGS. 6A and 6B, the plurality of first tapes 602 can change orientation every fifth row. In this example, the plurality of first tapes 602 can be oriented at a 90° relative to the X-axis in layer 610D. It is also contemplated that the plurality of second tapes 604 can change orientation in a given layer and that the orientation angles can range from 0° to 180°. The plurality of third tapes 606 can extend through each of the layers 610A, 610B, 610C, 610D, and 610E of the plurality of first tapes 602 and the plurality of second tapes 604. The plurality of third tapes 606 can extend across a selected tape of the plurality of first tapes 602 or the plurality of second tapes 604.

The 3D woven materials discussed herein can, in one example, be applied to a high performance hockey stick. The number of waves, loops, or crimps affects the ultimate rigidity of the formed product. For example, fewer waves, loops, or crimps provide a stiffer hockey stick shaft whereas a higher number of waves, loops, or crimps provides a more flexible and durable hockey stick shaft. In this way, the hockey stick can be formed with different weaves having varying amounts of interlacing to control stiffness and durability of the hockey stick. In one example, the orientation of the fibers can vary along the length of the shaft to provide differing properties along the shaft of the hockey stick. In one example, the interlacing and crimps can be greater in areas where higher impacts occur such as the striking portion of the hockey stick shaft, and a lower number of interlacing and crimps can be included in areas of the shaft where the shaft of the stick should be more rigid such as the upper portions of the shaft where the player holds the shaft of the hockey stick.

Specifically, in the middle area of the hockey stick, the area below where the player positions his hand to take a shot or make a pass can have a higher number of tows or tapes oriented in the warp or X direction and fewer tapes or tows interlacing to create a stiff region. An area lower on the shaft that is prone to more impacts can have an increased number tows or tapes oriented in the weft direction or Y direction creating hoops and more interlacing to make that region stronger against delamination and impacts. For example, hoops are formed from wrapping the fibers in the perpendicular direction of the length of the weave when the weave is formed into the shape of a hockey stick shaft. These hoops provide stiffness when the weave is compressed.

Figure 7:
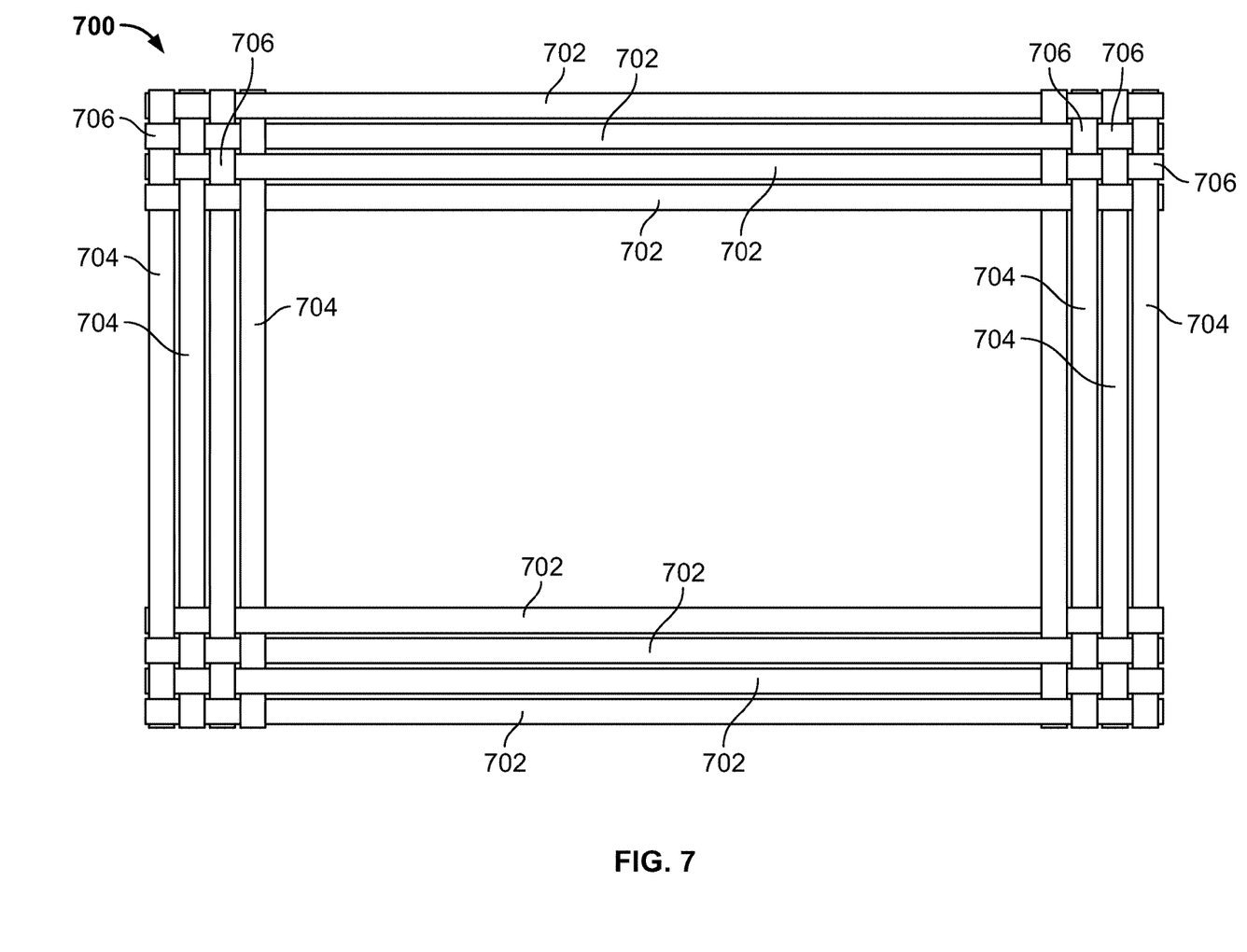
FIG. 7 illustrates another exemplary weaving pattern that can be applied to a sporting implement.

Another example of a 3D woven material 700 that could be utilized in sporting implement, such as a hockey stick is depicted in FIG. 7. Specifically, FIG. 7 shows a cross-sectional view of an example 3D woven material 700 as a weave for a hockey stick shaft. In this example, the weave 700 can be formed of two tape types, a plurality of first tapes 702 extending in the X direction, and a plurality of second tapes 704 extending in the Y direction.

Although the plurality of first tapes 702 and the plurality of second tapes 704 are shown generally orthogonal to each other, the plurality of first tapes 702 and the plurality of second tapes 704 can be oriented at different angles relative to each other. For example, the plurality of first tapes 702 and the plurality of second tapes 704 can be oriented from 0° to 90° relative to each other. Also the first tapes 702 and the second tapes 704 can be provided with varying fiber densities in order to provide the desired performance.

Additionally, each of the first tapes 702 and the second tapes 704 can extend in the Z-direction to provide a 3D woven fabric. For example, each of the first tapes 702 can extend at different angles relative to one another in the Z-direction. For example each of the first tapes 702 can alternate in extending at +45° relative to the z-axis and −45° relative to the z-axis. Therefore, at least two of the first plurality of tapes can be oriented at a first and second angle relative to the z-axis. The first angle of at least two of the first plurality of tapes can be greater than 20° from the z-axis and the second angle can be less than −20° from the z-axis.

Other angles relative to the Z-axis are also contemplated for example, ±5°, ±10°, ±15°, ±20°, ±25°, ±30°, ±35°, ±40°, ±45°, ±50°, ±55°, ±60°, ±65°, ±70°, ±80°, ±85° and can range from −90° to 90° from the Z-axis along with the combinations thereof. Likewise, each of the second tapes 704 can extend at different angles relative to one another in the Z direction. For example each of the second tapes 704 can alternate in extending at +45° relative to the z-axis and −45° relative to the z-axis. For example each of the second tapes 704 can alternate in extending at +45° relative to the z-axis and −45° relative to the z-axis. Therefore, at least two of the second plurality of tapes can be oriented at a first and second angle relative to the z-axis. The first angle of the at least two of the second plurality of tapes can be greater than 20° from the z-axis and the second angle can be less than −20° from the z-axis. Other angles relative to the Z-axis are also contemplated for example, ±5°, ±10°, ±15°, ±20°, ±25°, ±30°, ±35°, ±40°, ±45°, ±50°, ±55°, ±60°, ±65°, ±70°, ±80°, ±85° and can range from −90° to 90° from the Z-axis along with the combinations thereof.

The respective intersections of the plurality of first tapes 702 and the plurality of second tapes 704 can form crimps 706 to secure the plurality of first tapes and the plurality of second tapes 704. In this example, the crimps 706 are generally located in the four corners of the weave that also form the corners of the hockey stick shaft. The plurality of first tapes 702 form four intersections with the plurality of second tapes 704, and the crimps 706 help to secure the plurality of first tapes and the plurality of second tapes.

In this example, there can be no crimp or waviness in the fiber as the fiber is formed straight except in the areas where the warps 702 and wefts 704 meet. In the example of a hockey stick shaft, the corners can have a lot of interlacing (or interconnectivity), while the major and minor sides can have none. It can be desirable to apply this arrangement to a hockey stick, because most impacts occur in the corners of the shaft, and the corners of the shaft would be reinforced while not affecting much of the performance and rigidity of the stick.

Figure 8:
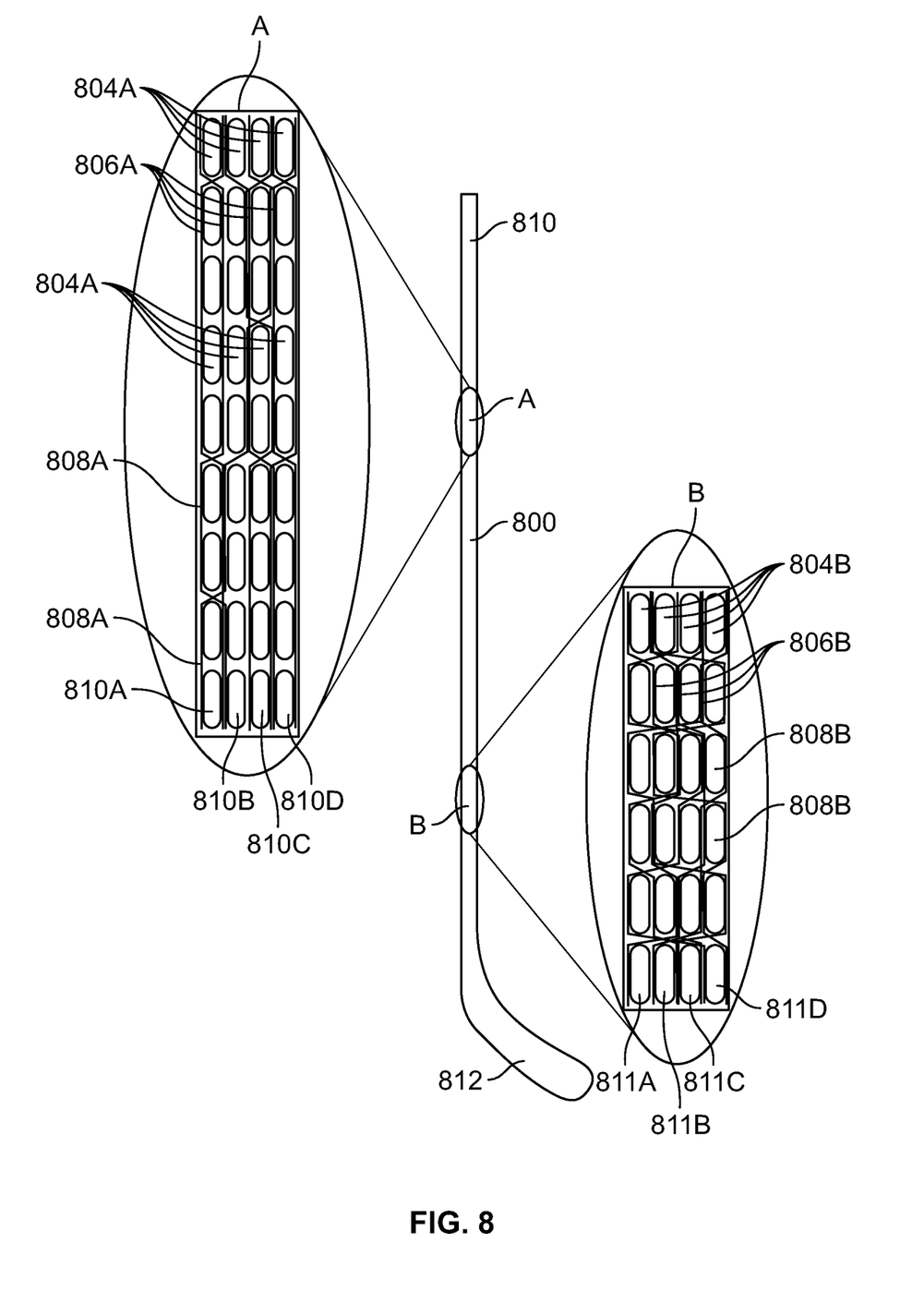
FIG. 8 illustrates another exemplary weaving pattern as applied to a sporting implement.

FIG. 8 shows an example schematic of a sporting implement, i.e., a hockey stick 800, which can utilize different weaves, for example the different weaves discussed herein, to provide for different rigidity along the shaft of the stick. Two portions A and B of the hockey stick shaft are shown magnified where both the areas A and B can be formed of different 3D weaves. As generally shown in FIG. 8, the area A toward the upper handle portion 810 of the shaft can be formed of a weave having a fewer number of fiber tapes extending in the Z direction than the area B near the blade 812 of the hockey stick. The example weave in portion A can provide a lower density weave having fewer interconnections than the weaving pattern shown in portion B.

Like in the above examples, the portion A weave can include a plurality of first tapes (not shown) extending in the X direction, a plurality of second tapes 804A extending in the Y direction, and a plurality of third tapes 806A extending in the Z direction. In this example, the plurality of first tapes and the plurality of second tapes 804A can form four rows or layers 810A, 810B, 810C, and 810D. However, other numbers of rows are also contemplated. In this example, the third tapes 806A can interconnect the layers in the Z direction every two to four second tapes 804A. In this example, although not shown, the plurality of second tapes 804A in the portion A weave can be greater than the plurality of first tapes. In one example, in the portion A weave, the ratio of the third plurality of tapes to the total number of the first plurality of tapes and of the second plurality of tapes is 0.5% to 10%. In another example, the ratio can be 5%.

However, as shown in the portion B weave, the third tapes 806B can interconnect the rows or layers 811A, 811B, 811C, and 811D in the Z direction every second tapes 804B. The higher number of interconnectivities in the portion B weave provides for a higher density structure than the portion A weave. Also, the portion A weave can be stiffer than the portion B weave by providing fewer crimps (or interconnectivities) between the rows 810A, 810B, 810C, and 810D in the portion A weave. Specifically, the portion A weave can include a first number of loops 808A that interconnect the first plurality of tapes extending in the X direction with the second plurality of tapes extending in the Y direction, and the portion B weave can include a second number of loops 808B interconnecting the first plurality of tapes extending in the X direction with the second plurality of tapes extending in the Y direction. In this example, the first number of loops 808A can be less than the second number of loops 808B. Again, a higher number of loops or crimps lowers the rigidity of the fibers and helps to prevent delamination. Also like the portion A weave, in one example, the ratio of the third plurality of tapes to the total number of the first plurality of tapes and of the second plurality of tapes is 0.5% to 10% in the portion B weave. In another example, the ratio can be 5%.

Also in this example, although not shown, the plurality of first tapes can be greater than the plurality of second tapes 804B in the portion B weave. In this example, the plurality of first tapes in the portion A weave is equal to the plurality of first tapes in the portion B weave, and the plurality of second tapes 804A in the portion A weave is equal to the plurality of second tapes 804B in the portion B weave. It is also contemplated that the hockey stick 800 can be provided with more than two weave types, for example, the hockey stick could be formed of 3, 4, 5, 6, etc. weave types depending on the desired stiffness and durability properties of the stick.

In other examples, it is contemplated that the 3D weave can remain constant throughout the length. In this case, the same 3D weave is used for the entire shaft. Providing the same 3D weave throughout the entire shaft can be easier to manufacture because it requires much simpler machinery, reduces the set-up time, and can create a lower cost formed part.

In other alternative examples, each layer, which can be formed by weaving fabrics in the X direction and in the Y direction can be stitched together through the thickness of each of the layers formed in the X and the Y direction. The stitching could be applied in the orthogonal direction to fabricate a stronger sporting implement in the Z direction.

In addition to the shaft of the stick, the 3D woven material can be used to form the blade of the hockey stick. In this example, the core can be a foam core. The 3D woven material forming the blade can connect the front face of the blade to the rear face of the blade to provide for additional structural rigidity in the blade itself. In other examples, however, the woven material may not connect the front face to the back face. This may be desirable in a process where traditional core materials (such as solid foams) would be used to create the pressure to compress the laminate in order to achieve the desired compaction or in cost sensitive applications where the operation can be simplified by only wrapping the woven material around the blade core. In this example, the 3D woven material could be formed into the shape of the blade, and a foam material or a core made of a synthetic material reinforced with layers of fibers could be inserted into the 3D woven material at one end of the blade.

The examples discussed herein help to reduce and potentially eliminate the possibility of fiber delamination, which helps to give the formed product a better resistance to impact, and can increase the overall performance of the formed product. Also the use of multilayer weaving for a sporting implement allows for a limitless design possibility, such as having particular zones that are more impact resistant, while others are designed to maximize stiffness, having multiple materials used in different areas with varying ratios.

In one example embodiment, a sporting implement may include a shaft having a first end and a second end. The first end may include a first 3D woven material, and the second end may include a second 3D woven material. The first 3D woven material can include a first layer and a second layer. The first layer and the second layer may include a first plurality of tapes extending in the X direction and a second plurality of tapes extending in the Y direction and a third plurality of tapes extending in the Z direction interconnecting the first layer and the second layer. The second 3D woven material may include a first layer and a second layer. The first layer and the second layer may include a first plurality of tapes extending in the X direction and a second plurality of tapes extending in the Y direction and a third plurality of tapes extending in the Z direction interconnecting the first layer and the second layer. The number of third tapes extending in the Z direction in the first 3D woven material can be less than the number of third tapes extending in the Z direction in the second 3D woven material.

The plurality of third tapes in the first 3D woven material and the plurality of third tapes in the second 3D woven material may also extend in the X direction. In the first 3D woven material the plurality of third tapes may extend at a first angle relative to the first layer and in the second 3D woven material the plurality of third tapes may extend at a second angle relative to the first layer. The first angle can be less than the second angle. The plurality of second tapes can be greater than the plurality of first tapes in the first woven material. The plurality of first tapes can be greater than the plurality of second tapes in the second woven material. The plurality of first tapes in the first woven material can be equal to the plurality of first tapes in the second woven material, and the plurality of second tapes in the first woven can be equal to the plurality of second tapes in the second woven material. The first layer and the second layer of the first woven material can be oriented at different angles relative to each other, and the first layer and the second layer of the first woven material can be oriented in the range of 5° to 75° in relation to a longitudinal direction. The first layer and the second layer of the second woven material can be oriented at different angles, and the first layer and the second layer of the second woven material can be oriented in the range of 5° to 75° in relation to a longitudinal direction.

The first 3D woven material may include a first number of loops interconnecting the first plurality of tapes extending in the X direction with the second plurality of tapes extending in the Y direction and the second 3D woven material may include a second number of loops interconnecting the first plurality of tapes extending in the X direction with the second plurality of tapes extending in the Y direction. The first number of loops can be less than the second number of loops.

In another example, a sporting implement may include a first plurality of tapes extending in a warp direction, and a second plurality of tapes extending in a weft direction. The first plurality of tapes can form an intersection with the second plurality of tapes and the first plurality of tapes can form four intersections with the second plurality of tapes. The first plurality of tapes and the second plurality of tapes may also extend in the z direction. At least two of the first plurality of tapes can be oriented at a first and second angle relative to the z-axis, and at least two of the second plurality of tapes can be oriented at a first and second angle relative to the z-axis.

The first angle of at least two of the first plurality of tapes can be greater than 20° from the z-axis and the second angle can be less than −20° from the z-axis, and the first angle of the at least two of the second plurality of tapes can be greater than 20° from the z-axis and the second angle can be less than −20° from the z-axis. In another example, the first angle of at least two of the first plurality of tapes can be 45° from the z-axis and the second angle can be −45° from the z-axis. Moreover, the first angle of the at least two of the second plurality of tapes can be 45° from the z-axis, and the second angle can −45° from the z-axis. The first plurality of tapes can alternatingly extend at a first angle and a second angle relative to the z-axis, and the second plurality of tapes can alternatingly extend at a first angle and a second angle relative to the z-axis.

In another example, a method of forming a sporting implement may include one or more of the following steps: forming a first 3D woven material for a first end of the sporting implement and forming a second 3D woven material for a second end of the sporting implement, forming the first 3D woven material of a first layer and a second layer. The first layer and the second layer may include a first plurality of tapes extending in the X direction and a second plurality of tapes extending in the Y direction and a third plurality of tapes extending in the Z direction interconnecting the first layer and the second layer.

The method may also include forming the second 3D woven material of a first layer and a second layer the first layer and the second layer may include a first plurality of tapes extending in the X direction and a second plurality of tapes extending in the Y direction and a third plurality of tapes extending in the Z direction interconnecting the first layer and the second layer. The number of third tapes extending in the Z direction in the first 3D woven material can be less than the number of third tapes extending in the Z direction in the second 3D woven material.

The method may also include weaving the plurality of third tapes in the first 3D woven material and the plurality of third tapes in the second 3D woven material in the X direction, weaving the plurality of third tapes at a first angle relative to the first layer in the first 3D woven material, and weaving the plurality of third tapes at a second angle relative to the first layer in the second 3D woven material. The first angle can be less than the second angle. The plurality of second tapes can be greater than the plurality of first tapes in the first woven material. The plurality of first tapes can also be greater than the plurality of second tapes in the second woven material. The plurality of first tapes in the first woven material can be equal to the plurality of first tapes in the second woven material, and the plurality of second tapes in the first woven can be equal to the plurality of second tapes in the second woven material.

The method may also include orienting the first layer and the second layer of the first woven material at different angles relative to each other, and orienting the first layer and the second layer of the first woven material in the range of 5° to 75° in relation to a longitudinal direction. The method may also include orienting the first layer and the second layer of the second woven material at different angles, and orienting the first layer and the second layer of the second woven material in the range of 5° to 75° in relation to a longitudinal direction. The method may also include providing the first 3D woven material with a first number of loops interconnecting the first plurality of tapes extending in the X direction with the second plurality of tapes extending in the Y direction and providing the second 3D woven material with a second number of loops interconnecting the first plurality of tapes extending in the X direction with the second plurality of tapes extending in the Y direction. The first number of loops can be less than the second number of loops.

The reader should understand that these specific examples are set forth merely to illustrate examples of the invention, and they should not be construed as limiting the invention. Many variations in the connection system may be made from the specific structures described above without departing from this invention.

While the invention has been described in detail in terms of specific examples including presently preferred modes of carrying out the invention, those skilled in the art will appreciate that there are numerous variations and permutations of the above described systems and methods. Thus, the spirit and scope of the invention should be construed broadly as set forth in the appended claims.

What is claimed is:

1. A sporting implement having a 3D woven material comprising:
   a first plurality of tapes extending in a warp direction;
   a second plurality of tapes extending in a weft direction;
   a third plurality of tapes extending in the Z direction;

wherein the first plurality of tapes forms four intersections with the second plurality of tapes, wherein the first plurality of tapes alternatingly extend at a first angle and a second angle relative to the z-axis and the second plurality of tapes alternatingly extend at a first angle and a second angle relative to the z-axis;

the sporting implement comprising a shaft having a first end and second end, wherein both the first end and second end of the shaft include the 3D woven material.

2. The sporting implement of claim 1 wherein the first angle that the first plurality of tapes alternatingly extends is greater than 20° from the z-axis and the second angle is less than −20° from the z-axis.

3. The sporting implement of claim 1 wherein the first angle that the second plurality of tapes alternatingly extends is greater than 20° from the z-axis and the second angle is less than −20° from the z-axis.

4. The sporting implement of claim 1 wherein the first angle that the first plurality of tapes alternatingly extends is 45° from the z-axis and the second angle is −45° from the z-axis.

5. The sporting implement of claim 1 wherein the first angle that the second plurality of tapes alternatingly extends is 45° from the z-axis and the second angle is −45° from the z-axis.

\* \* \* \* \*